United States Patent
Messer et al.

(10) Patent No.: US 9,560,504 B2
(45) Date of Patent: Jan. 31, 2017

(54) SECONDARY MOBILE DEVICE

(75) Inventors: Alan Messer, Los Gatos, CA (US);
Kyoung-Lae Noh, Suwon (KR)

(73) Assignee: Samsung Electronics Co., Ltd.,
Suwon-si (KR)

( * ) Notice: Subject to any disclaimer, the term of this patent is extended or adjusted under 35 U.S.C. 154(b) by 811 days.

(21) Appl. No.: 13/136,500

(22) Filed: Aug. 1, 2011

(65) Prior Publication Data

US 2013/0036187 A1 Feb. 7, 2013

(51) Int. Cl.
*G06F 15/16* (2006.01)
*H04W 4/20* (2009.01)
*G06F 9/54* (2006.01)

(52) U.S. Cl.
CPC .............. *H04W 4/203* (2013.01); *G06F 9/542* (2013.01)

(58) Field of Classification Search
CPC . H04L 29/0617; H04L 65/1083; H04W 4/003; H04W 4/16; H04N 21/4122; H04N 21/4126; G06F 3/0481; G06F 9/542; G06F 17/30017; H04M 1/7253; H04M 19/04; H04M 19/041; H04Q 1/136; H01R 13/2421
USPC ........ 709/206, 224, 227, 230, 204; 455/414, 455/426, 567, 41.2, 435.2, 420, 518, 41.3, 455/517; 719/328; 379/88.23, 93.02, 379/88.12; 348/14.02; 345/174, 520; 715/808; 340/4.12, 540; 439/344
See application file for complete search history.

(56) References Cited

U.S. PATENT DOCUMENTS

| | | | | |
|---|---|---|---|---|
| 5,964,839 | A * | 10/1999 | Johnson et al. | 709/224 |
| 6,122,348 | A * | 9/2000 | French-St. George et al. | 379/88.23 |
| 6,272,359 | B1 * | 8/2001 | Kivela et al. | 455/567 |
| 6,424,251 | B1 * | 7/2002 | Byrne | H04M 19/041 340/4.12 |
| 6,678,734 | B1 * | 1/2004 | Haatainen et al. | 709/230 |
| 6,714,233 | B2 * | 3/2004 | Chihara et al. | 348/14.02 |
| 7,016,707 | B2 * | 3/2006 | Fujisawa et al. | 455/567 |
| 7,840,681 | B2 * | 11/2010 | Acharya et al. | 709/227 |
| 8,090,364 | B2 * | 1/2012 | Delalat | 455/420 |
| 8,489,095 | B2 * | 7/2013 | Oh et al. | 455/435.2 |
| 8,661,141 | B2 * | 2/2014 | Song et al. | 709/227 |
| 2002/0009989 | A1 * | 1/2002 | Kanesaka et al. | 455/414 |
| 2002/0115435 | A1 * | 8/2002 | Soh | 455/426 |
| 2006/0070090 | A1 * | 3/2006 | Gulkis | 719/328 |
| 2006/0133586 | A1 * | 6/2006 | Kasai | G06F 17/30017 379/88.12 |
| 2006/0160396 | A1 * | 7/2006 | Macauley | H04Q 1/136 439/344 |
| 2007/0192734 | A1 * | 8/2007 | Berstis | G06F 3/0481 715/808 |
| 2008/0070612 | A1 * | 3/2008 | Weinans | H04M 1/7253 455/517 |
| 2010/0112949 | A1 * | 5/2010 | Kim | H01R 13/2421 455/41.3 |
| 2011/0044438 | A1 * | 2/2011 | Wang et al. | 379/93.02 |
| 2011/0074794 | A1 * | 3/2011 | Felt et al. | 345/520 |
| 2011/0143757 | A1 * | 6/2011 | Oh et al. | 455/435.2 |

(Continued)

*Primary Examiner* — Dustin Nguyen
(74) *Attorney, Agent, or Firm* — Sherman IP LLP; Kenneth L. Sherman; Hemavathy Perumal

(57) ABSTRACT

In a first embodiment of the present invention, a method is provided comprising: receiving application data from a primary mobile device, wherein the application data is received via hooks designed to automatically send the application data received by or sent from an application on the primary mobile device; and sending the application data to one or more secondary mobile devices that are registered (Continued)

to the primary mobile device, wherein each of the secondary mobile devices are resource limited devices.

21 Claims, 4 Drawing Sheets

(56) References Cited

U.S. PATENT DOCUMENTS

| | | | |
|---|---|---|---|
| 2011/0161436 A1* | 6/2011 | Moore | G06F 9/542 |
| | | | 709/206 |
| 2011/0258275 A1* | 10/2011 | Rao | 709/206 |
| 2011/0273393 A1* | 11/2011 | Wu et al. | 345/174 |
| 2011/0316698 A1* | 12/2011 | Palin | H04M 19/04 |
| | | | 340/540 |
| 2012/0083259 A1* | 4/2012 | Chang | 455/418 |
| 2012/0173622 A1* | 7/2012 | Toledano et al. | 709/204 |
| 2013/0059539 A1* | 3/2013 | Elsom-Cook | 455/41.2 |

* cited by examiner

SECONDARY MOBILE DEVICE

BACKGROUND OF THE INVENTION

1. Field of the Invention

The present invention relates generally to consumer electronic devices. More specifically, the present invention relates to a secondary mobile device.

2. Description of the Related Art

Mobile devices, most particularly in the form of cellular phones, have become the prevalent mode of communication for many people. As these devices have become more powerful, the processing power and memory capabilities of these devices have allowed them to become closer to computers than phones. Such intelligent cellular phones are often called "smartphones." More recently, tablet computers have become increasingly popular as well. These tablet computers may have access to cellular services via embedded 3G/4G antennas, or may access cellular services indirectly through a WiFi connection. However, rather than supplant the use of smartphones, what has occurred is that many users have both a smartphone and a tablet computer. This trend of having more and more "smart" devices within the control of a single user may become even stronger in the future.

While users may wish to utilize their smartphone as their primary mode of electronic verbal communication, other non-verbal cellular communications, such as text messages, need not be so limited. It would be beneficial if the user could have a device that supplements the smartphone or tablet computer to provide for communications without needing to access the smartphone or tablet computer.

SUMMARY OF THE INVENTION

In a first embodiment of the present invention, a method is provided comprising: receiving application data from a primary mobile device, wherein the application data is received via hooks designed to automatically send the application data received by or sent from an application on the primary mobile device; and sending the application data to one or more secondary mobile devices that are registered to the primary mobile device, wherein each of the secondary mobile devices are resource limited devices.

In a second embodiment of the present invention, a server is provided comprising: a memory storing list having a plurality of members, each of the members being either a primary or secondary mobile device; one or more communications interfaces designed to communicate with each member of the list; a processor configured to: receive application data from a primary mobile device via one of the communications interfaces, wherein the application data is received via hooks designed to automatically send the application data received by or sent from an application on the primary mobile device; and send the application data to one or more secondary mobile devices that are members of the list via one of the communications interfaces, wherein each of the secondary mobile devices are resource limited devices.

In a third embodiment of the present invention, a secondary mobile device is provided, comprising: a processor; a memory; a power supply; wherein the processor, memory, and power supply are resource limited such that an application running on a primary mobile device cannot be adequately run on the secondary mobile device; a wireless radio; and a user interface designed to receive application data via the wireless radio from a server, wherein the server receives the application data from the primary mobile device via hooks designed to automatically send the application data received by or sent from the application, wherein the secondary mobile device is registered to the primary mobile device with the server, and to communicate the application data to a user of the secondary mobile device.

In a fourth embodiment of the present invention a non-transitory program storage device readable by a machine tangibly embodying a program of instructions executable by the machine is provided to perform a method comprising: receiving application data from a primary mobile device, wherein the application data is received via hooks designed to automatically send the application data received by or sent from an application on the primary mobile device; and sending the application data to one or more secondary mobile devices registered with a server, wherein each of the secondary mobile devices are resource limited devices.

In a fifth embodiment of the present invention, an apparatus is provided comprising: means for receiving application data from a primary mobile device, wherein the application data is received via hooks designed to automatically send the application data received by or sent from an application on the primary mobile device; and means for sending the application data to one or more secondary mobile devices that are registered with a server, wherein each of the secondary mobile devices are resource limited devices.

DETAILED DESCRIPTION OF SPECIFIC EMBODIMENTS

Figure 1:
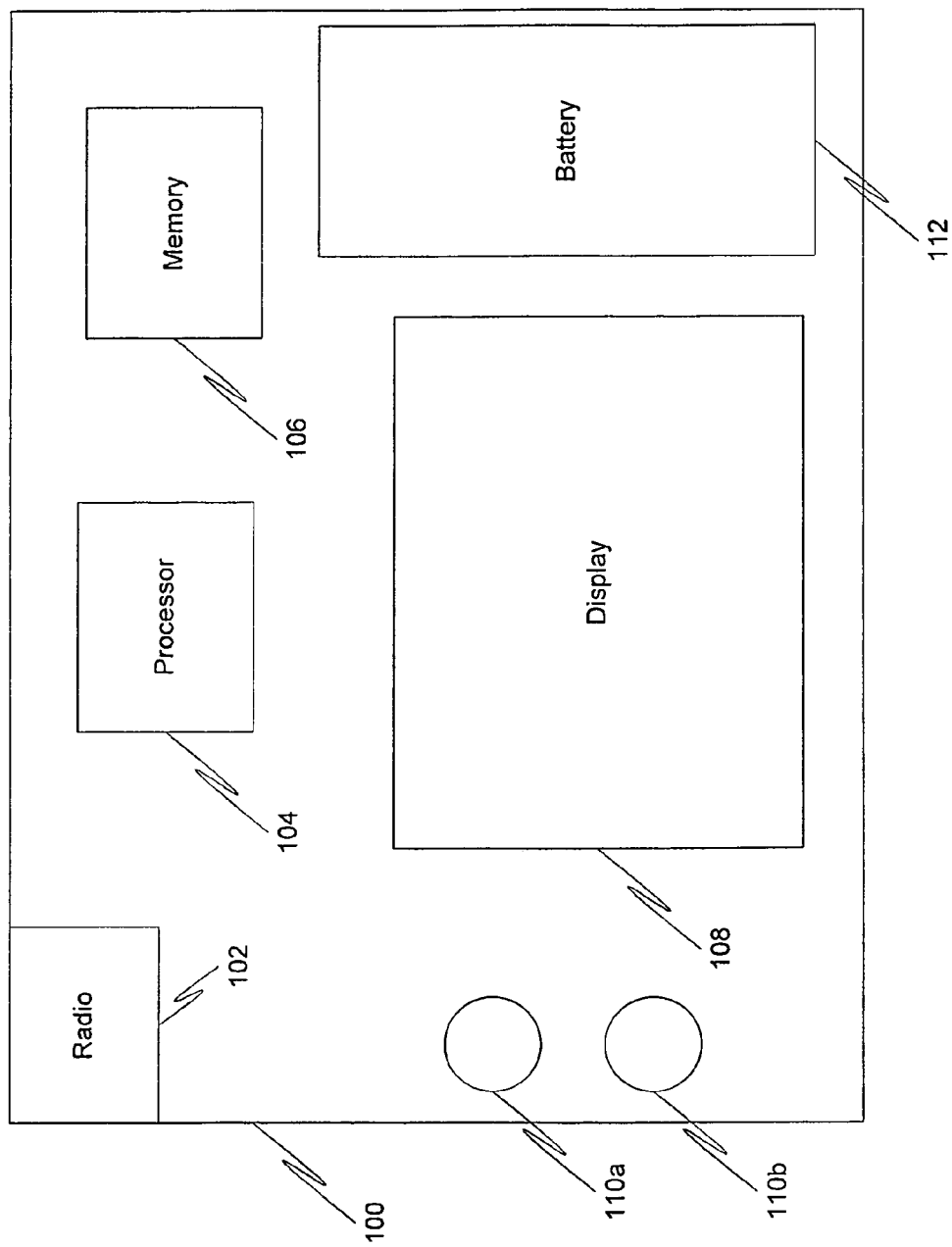
FIG. 1 is a diagram illustrating a secondary device in accordance with an embodiment of the present invention.

Reference will now be made in detail to specific embodiments of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims. In the following description, specific details are set forth in order to provide a thorough understanding of the present invention. The present invention may be practiced without some or all of these specific details. In addition, well known features may not have been described in detail to avoid unnecessarily obscuring the invention.

In accordance with the present invention, the components, process steps, and/or data structures may be implemented using various types of operating systems, programming languages, computing platforms, computer programs, and/or general purpose machines. In addition, those of ordinary skill in the art will recognize that devices of a less general purpose nature, such as hardwired devices, field programmable gate arrays (FPGAs), application specific integrated circuits (ASICs), or the like, may also be used, without departing from the scope and spirit of the inventive concepts disclosed herein. The present invention may also be tangibly embodied as a set of computer instructions stored on a computer readable medium, such as a memory device.

In one embodiment of the present invention, a secondary mobile device is provided that can be used in addition to or in lieu of a user's smartphone or tablet (or other primary device) when the user is unable or unwilling to use those devices. The secondary mobile device feeds off the user's primary device, by hooking into the primary device through a specialized server (known as a "SIMergy" service, described in more detail below) to obtain service information.

This secondary mobile device may be a low-powered, highly mobile device that is able to match some of the services that are already configured on the user's primary device. In doing so, the present invention provides a solution that allows a service to be delivered to the secondary device without requiring the resources or software of the primary device.

In one example, the secondary mobile device may be built into an accessory that may be worn or easily carried by a user, such as a watch, keychain accessory, or necklace. Due to the size limitations of such easily carried accessories, the processing power and/or memory of the secondary mobile device may be limited. However, the secondary mobile device may still have the requisite power and memory to run some of the applications or services on the user's primary device. The secondary mobile device may also have a small display to display output from the applications or services. In some embodiments, the secondary mobile device may also contain some mechanism for detecting user input. This may take the form of keys, buttons, pointing devices, etc., but in many embodiments it may be simplest to have a touchscreen device act as both the output device and the input device.

In some embodiments, the secondary mobile device may contain the capability to perform other functions unrelated to the present invention, such as acting as an mp3 or other music player, watch functions, an emergency "panic" alarm, etc.

In an embodiment of the present invention, services are duplicated from a primary device to one or more secondary devices. This may be accomplished by leveraging and adding to the primary device's system software to provide hooks for replicating information from an application or applications running on the primary device onto the secondary device. The system may hook into existing infrastructure such as notification mechanisms (e.g., popups and notification lists) and provide additional interfaces (e.g., messaging and user interface page displays) to allow an application to post updates that will be sent to the secondary devices. Applications can use the existing system infrastructure as normal to communicate with the user on the primary device, while the system hooks or application add-ones act to replicate some or all of the communications to the secondary device.

The present invention may introduce the idea of a SIMergy server. A SIMergy server is a server designed to coordinate services and data between groups of personal devices. The SIMergy server can take many forms. In one embodiment of the present invention, the SIMergy server is a software program operating on a primary device of a user's network. For example, the SIMergy server may operate on a laptop computer or tablet computer. However, in other embodiments of the present invention, the SIMergy server may operate on a separate device, such as a gateway, in a home network. In other embodiments, the SIMergy server may be controlled by a service provider.

In one example of the present invention, an application running on a smartphone may post a notification update to the notification system of the operating system of the primary mobile device. This displays to the user as normal, e.g., as a pull-down from the top of the screen, but the invention also hooks this notification to send the notification to a SIMergy server. That server may then have the device registered with it along with one or more secondary devices that want to receive the same information. The SIMengy server then forwards that notification on to the secondary devices.

The present invention may also provide interfaces for other communications with the secondary devices. For example, an interface may be provided to allow media (e.g., voicemail recordings) to be passed from the primary device to the secondary device(s). Likewise, the secondary devices can return updates to the SIMergy service, which then passes these updates to the primary device. For example, the user may be able to acknowledge and dismiss a notification on the secondary device and have the fact that the notification was dismissed passed back to the primary device, so the same notification no longer appears on the primary device.

FIG. 1 is a diagram illustrating a secondary device in accordance with an embodiment of the present invention. The secondary device 100 may contain a cellular radio 102, such as a 3G radio an embedded processor 104, and a memory 106. The processor 104 and memory 106 may be powerful enough to run a SIMergy client program. The SIMergy client may provide an interface that allows input through a touchscreen display 108. Alternatively, one or more buttons 110a, 110b may be provided for input. A battery 112 may be powerful enough to run the cellular radio 102, processor 104, and memory 106 to operate the SIMergy client program.

The SIMergy client program may act as a receiver of SIMergy server messages, as well as a user interface initiator to duplicate the service. When the SIMergy server receives a message from the primary device hooks, it forwards the message onto the secondary device software on the secondary devices. The software then uses those messages to inform the user appropriately. For example, a notification message may cause the secondary device to "glow" a particular color and display the service icon with a notification number to alert the user.

Figure 2:
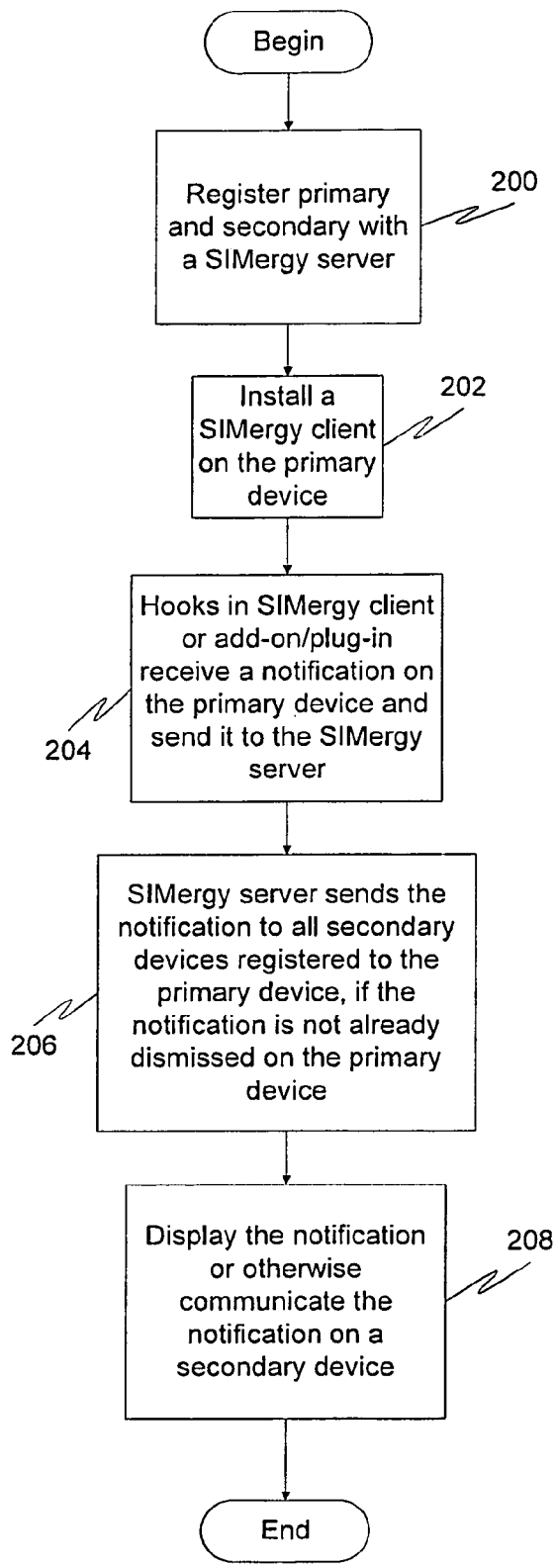
FIG. 2 is a flow diagram illustrating a general method for providing a secondary mobile device in accordance with an embodiment of the present invention.

FIG. 2 is a flow diagram illustrating a general method for providing a secondary mobile device in accordance with an embodiment of the present invention. At 200, primary and secondary devices are registered with a SIMergy server. This may be accomplished in a number of different ways. In one embodiment, the user can register the devices through the interface of either a primary or secondary device. In another embodiment, the user can utilize a separate device, such as a desktop or laptop computer, to register the devices. In another embodiment of the present invention, a service provider may register the devices. For example, if a single service provider provides both the primary and secondary device to a single user, the service provider can "preregister" the devices under the user's name. Indeed, even if the service provider didn't provide the devices, but the devices have been registered with the service provider (e.g., configured to work with the service provider's network), the service provider can register the devices with the SIMergy server.

At 202, a SIMergy client is installed on the primary device. This SIMergy client interfaces with the operating system of the primary device and hooks into the existing infrastructure of the phone. The SIMergy client may provide new Application Program Interfaces (APIs) to the operating system. It should be noted that in an alternative embodiment of the present invention, the "hooks" may be embedded into an add-on or plug-in to an existing application on the primary device, instead of interfacing directly with the operating system.

At 204, when an update to a relevant application is received by or sent from the application on the primary device, the hooks in either the SIMergy client or the add-on/plug-in receive the notification and send it to the SIMergy server. The application continues to operate as normal on the primary device. For example, the user can read the notification and dismiss it. If this occurs, this dismissal can be forwarded to the SIMergy server using the same mechanism as the original notification was forwarded. It should be noted that while notifications are discussed in this embodiment, the updates that are forwarded to the SIMergy server (and ultimately the secondary device) can be any sort of data, including, for example, voice messages, text messages, other UI elements, etc.

At 206, if the notification is not already dismissed on the primary device, the SIMergy server sends the notification to all secondary devices registered to the primary device. At 208, at a secondary device registered to the primary device, the notification may be displayed or otherwise communicated to the user. Should the user interact with the notification, such as dismiss it, this action can then be communicated back to the SIMergy server so that this interaction can be reflected on the primary device.

Figure 3:
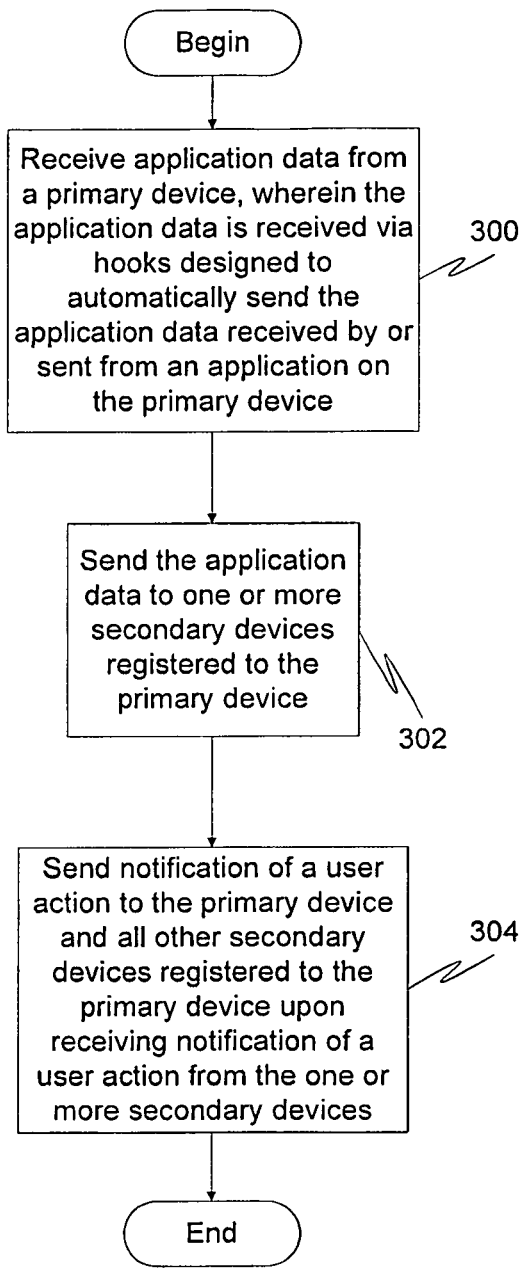
FIG. 3 is a flow diagram illustrating a method in accordance with an embodiment of the present invention.

FIG. 3 is a flow diagram illustrating a method in accordance with an embodiment of the present invention. The steps of the method may be performed at a SIMergy or other similar server. At 300, application data is received from a primary mobile device, wherein the application data is received via hooks designed to automatically send the application data received by or sent from an application on the primary mobile device. The hooks may be contained in client software that interfaces directly with an operating system of the primary mobile device to intercept communications between applications and the operating system. Alternatively, the hooks may be contained in a plug-in to the application on the primary mobile device. The application data may be, for example, a notification of an event (such as a calendar event or phone call), a text message, or a voice mail message.

At 302, the application data is sent to one or more secondary mobile devices that are registered to the primary mobile device with the server. Each of the secondary mobile devices may be a resource limited device. At 304, upon receiving notification of a user action from the one or more secondary mobile devices that was in response to the one or more secondary mobile devices communicating the application data to a user, notification of the user action may be sent to the primary mobile device and all other secondary mobile devices registered to that primary mobile device.

Figure 4:
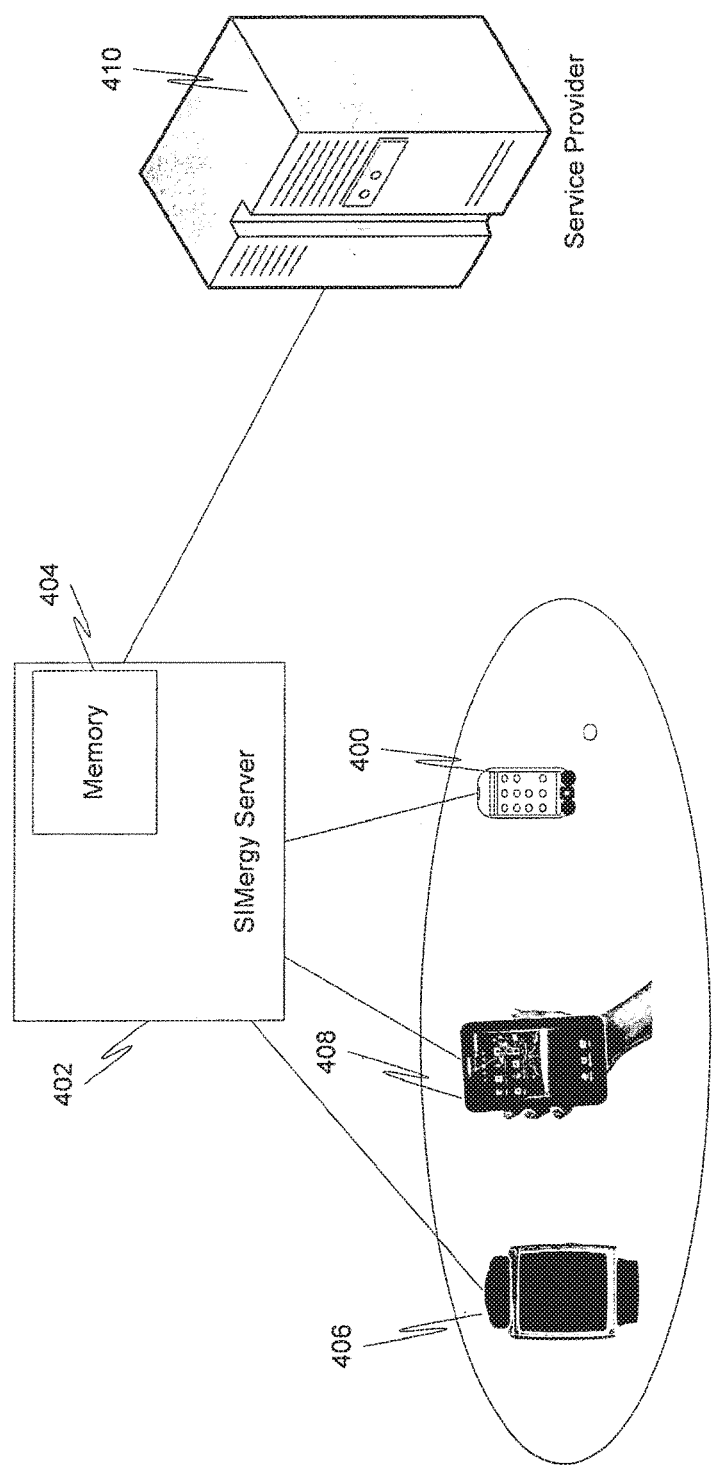
FIG. 4 is a block diagram illustrating a system in accordance with an embodiment of the present invention.

FIG. 4 is a block diagram illustrating a system in accordance with an embodiment of the present invention. A primary mobile device 400 contains an application or applications that, via hooks, transmit application data to SIMergy server 402. The SIMergy server 402 then accesses a memory 404 that contains information about registered primary devices. If the primary mobile device 400 is identified in this memory 404, then secondary devices 406, 408 that are registered to the primary device receive the application data from the SIMergy server 402.

As will be appreciated to one of ordinary skill in the art, the aforementioned example architectures can be implemented in many ways, such as program instructions for execution by a processor, as software modules, microcode, as computer program product on computer readable media, as logic circuits, as application specific integrated circuits, as firmware, as consumer electronic device, etc. and may utilize wireless devices, wireless transmitters/receivers, and other portions of wireless networks. Furthermore, embodiment of the disclosed method and system for displaying multimedia content on multiple electronic display screens can take the form of an entirely hardware embodiment, an entirely software embodiment, or an embodiment containing both software and hardware elements.

The term "computer readable medium" is used generally to refer to media such as main memory, secondary memory, removable storage, hard disks, flash memory, disk drive memory, CD-ROM and other forms of persistent memory. It should be noted that program storage devices, as may be used to describe storage devices containing executable computer code for operating various methods of the present invention, shall not be construed to cover transitory subject matter, such as carrier waves or signals. Program storage devices and computer readable medium are terms used generally to refer to media such as main memory, secondary memory, removable storage disks, hard disk drives, and other tangible storage devices or components.

Although only a few embodiments of the invention have been described in detail, it should be appreciated that the invention may be implemented in many other forms without departing from the spirit or scope of the invention. Therefore, the present embodiments should be considered illustrative and not restrictive and the invention is not to be limited to the details given herein, but may be modified within the scope and equivalents of the appended claims.

What is claimed is:

1. A method comprising:
    receiving application data from a primary device, wherein the application data is obtained from an intercepted communication between an application and an operating system of the primary device via a hook into a notification mechanism, and the hook is configured to automatically send the application data from the primary device;
    sending at least a portion of the application data to a secondary mobile device that is registered along with the primary device, wherein the secondary mobile device is a resource limited device; and
    coordinating a service and the application data between the primary device and the secondary mobile device based on an interaction with a notification on one of the primary device and the secondary mobile device;
    wherein, in response to determining the notification is not dismissed on the primary device, the notification is sent to the secondary mobile device; and
    wherein, in response to determining the notification is acknowledged and dismissed on the secondary mobile device, dismissal of the notification on the secondary mobile device is communicated to the primary device causing the notification to no longer appear on the primary device.

2. The method of claim 1, wherein the hook provides an interface comprising a messaging and user interface page display to allow the application to post an update that is sent to the secondary mobile device.

3. The method of claim 1, wherein the hook is included in a plug-in to the application on the primary device.

4. The method of claim 1, further comprising:
upon receiving notification of an interaction with the notification from the secondary mobile device, sending notification of the interaction to the primary device.

5. The method of claim 1, wherein the application data comprises the notification, and the service is duplicated from the primary device to the secondary mobile device without the secondary mobile device requiring resources and application software used by the primary device to access the service.

6. The method of claim 1, wherein the application data is at least one of a text message and a voicemail message.

7. The method of claim 1, wherein the notification mechanism comprises a visual popup.

8. A system comprising:
at least one processor; and
a non-transitory processor-readable memory device storing instructions that when executed by the at least one processor causes the at least one processor to perform operations including:
obtaining application data from a primary device, wherein the application data is received from an intercepted communication between an application and an operating system of the primary device via a hook into a notification mechanism, and the hook is configured to automatically send the application data from the primary device;
sending at least a portion of the application data to a secondary mobile device, wherein the secondary mobile device is a resource limited device; and
coordinating a service and the application data between the primary device and the secondary mobile device based on an interaction with a notification on one of the primary device and the secondary mobile device;
wherein, in response to determining the notification is not dismissed on the primary device, the notification is sent to the secondary mobile device; and
wherein, in response to determining the notification is acknowledged and dismissed on the secondary mobile device, dismissal of the notification on the secondary mobile device is communicated to the primary device causing the notification to no longer appear on the primary device.

9. The system of claim 8, wherein notification mechanism comprises a visual popup.

10. The system of claim 8, wherein the application data comprises the notification, and the service is duplicated from the primary device to the secondary mobile device without the secondary mobile device requiring resources and application software used by the primary device to access the service.

11. A secondary mobile device comprising:
at least one processor; and
a non-transitory processor-readable memory device storing instructions that when executed by the at least one processor causes the at least one processor to perform operations including:
receiving application data, wherein the application data is obtained from an intercepted communication between an application and an operating system of a primary device via a hook into a notification mechanism, and the hook is configured to automatically send at least a portion of the application data from the primary device; and
displaying the application data on a display of the secondary mobile device;
wherein a service and the application data are coordinated with the secondary mobile device based on an interaction with a notification on one of the primary device and the secondary mobile device;
wherein, in response to determining the notification is not dismissed on the primary device, the secondary mobile device receives the notification; and
wherein, upon acknowledging and dismissing the notification on the secondary mobile device, the secondary mobile device communicates dismissal of the notification on the secondary mobile device causing the notification to no longer appear on the primary device.

12. The secondary mobile device of claim 11, wherein the operations further comprise:
detecting an interaction with the notification on the secondary mobile device; and
sending information relating to the interaction detected via a wireless radio.

13. The secondary mobile device of claim 11, wherein the operations further comprise:
displaying the notification on the display of the secondary mobile device.

14. The secondary mobile device of claim 11, wherein the operations further comprise:
displaying the application data on a touchscreen display of the secondary mobile device; and
detecting touch on the touchscreen display.

15. A non-transitory processor-readable medium that includes a program that when executed by a processor performs a method comprising:
obtaining application data from a primary device, wherein the application data is obtained from an intercepted communication between an application and an operating system of the primary device via a hook into a notification mechanism, and the hook is configured to automatically send the application data from the primary device;
sending at least a portion of the application data to a secondary mobile device, wherein the secondary mobile device is a resource limited device; and
coordinating a service and the application data between the primary device and the secondary mobile device based on an interaction with a notification on one of the primary device and the secondary mobile device;
wherein, in response to determining the notification is not dismissed on the primary device, the notification is sent to the secondary mobile device; and
wherein, in response to determining the notification is acknowledged and dismissed on the secondary mobile device, dismissal of the notification on the secondary mobile device is communicated to the primary device causing the notification to no longer appear on the primary device.

16. The non-transitory processor-readable medium of claim 15, wherein the primary device comprises a smartphone or a tablet computer.

17. The non-transitory processor-readable medium of claim 15, wherein the notification mechanism comprises at least one of a popup and a notification list.

18. A method comprising:
receiving application data, wherein the application data is obtained from an intercepted communication between an application and an operating system of a primary device via a hook into a notification mechanism, and the hook is configured to automatically send at least a portion of the application data from the primary device; and displaying the application data on a display of a secondary mobile device;

wherein a service and the application data are coordinated with the secondary mobile device based on an interaction with a notification on one of the primary device and the secondary mobile device;

wherein, in response to determining the notification is not dismissed on the primary device, the secondary mobile device receives the notification; and wherein, upon acknowledging and dismissing the notification on the secondary mobile device, the secondary mobile device communicates dismissal of the notification on the secondary mobile device causing the notification to no longer appear on the primary device.

19. The method of claim 1, wherein interaction with the application data on the secondary mobile device is reflected on the primary mobile device.

20. The secondary mobile device of claim 11, wherein the notification mechanism comprises a visual popup, and the secondary mobile device comprises a watch device, a keychain device, or a necklace device.

21. The method of claim 18, wherein the notification mechanism comprises a visual popup, and the secondary mobile device comprises a watch device, a keychain device, or a necklace device.

* * * * *